United States Patent
Varaprasad

(10) Patent No.: US 7,659,001 B2
(45) Date of Patent: Feb. 9, 2010

(54) COATING WITH INFRARED AND ULTRAVIOLET BLOCKING CHARACTERISTICS

(75) Inventor: Desaraju V. Varaprasad, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 447 days.

(21) Appl. No.: 11/229,837

(22) Filed: Sep. 20, 2005

(65) Prior Publication Data

US 2007/0065670 A1     Mar. 22, 2007

(51) Int. Cl.
B32B 15/04     (2006.01)
C23C 16/02    (2006.01)

(52) U.S. Cl. .................. 428/432; 428/426; 428/701; 427/248.1; 427/126.3; 427/255.19

(58) Field of Classification Search ............... 428/141, 428/143, 323, 325, 331, 412, 428, 432, 697, 428/702, 426, 701; 427/126.3, 165, 248.1, 427/250, 255.19
See application file for complete search history.

(56) References Cited

U.S. PATENT DOCUMENTS

| | | | |
|---|---|---|---|
| 5,316,854 A | * | 5/1994 | Lin et al. .................... 428/426 |
| 6,040,372 A | | 3/2000 | Watanabe et al. |
| 6,093,749 A | | 7/2000 | Watanabe et al. |
| 6,149,888 A | * | 11/2000 | Ota et al. .................... 423/617 |
| 6,180,224 B1 | | 1/2001 | Shouji et al. |
| 6,340,646 B1 | * | 1/2002 | Nagashima et al. ........... 501/64 |
| 6,376,066 B1 | | 4/2002 | Kanzaki et al. |
| 6,521,677 B2 | | 2/2003 | Yashiro et al. |
| 6,607,832 B1 | * | 8/2003 | Nagashima et al. ......... 428/428 |
| 6,686,047 B2 | | 2/2004 | Yamaguchi et al. |
| 6,723,423 B1 | | 4/2004 | Kaneko et al. |
| 6,787,236 B2 | * | 9/2004 | Kimura et al. .............. 428/412 |

FOREIGN PATENT DOCUMENTS

JP     08-134432     5/1996

* cited by examiner

Primary Examiner—Timothy M Speer
Assistant Examiner—Lauren Robinson
(74) Attorney, Agent, or Firm—Nixon & Vanderhye P.C.

(57) ABSTRACT

A composite oxide coating is provided that efficiently blocks both ultraviolet (UV) and infrared (IR) radiation. Certain embodiments of this invention relate to a coating having IR and UV blocking characteristics. In certain example embodiments, the coating includes a silica matrix, zinc antimonite, and a UV blocking material such as cerium oxide, thereby permitting the coating after application to block significant amounts of both IR and UV radiation.

19 Claims, 1 Drawing Sheet

COATING WITH INFRARED AND ULTRAVIOLET BLOCKING CHARACTERISTICS

This invention relates to a coating (e.g., deposited using a colloidal electro-conductive oxide solution) having infrared (IR) and ultraviolet (UV) blocking characteristics. In certain example embodiments of this invention, a substantially transparent composite oxide coating is provided that includes a silica matrix, zinc, antimonate, and a UV blocking material, thereby permitting the coating (e.g., sol type) after application to block significant amounts of both IR and UV radiation.

BACKGROUND AND SUMMARY OF EXAMPLE EMBODIMENTS OF THE INVENTION

Commercial products such as low-E coatings used for solar energy management effectively block large amounts of infrared (IR) radiation but fail to block significant amounts of ultraviolet (UV) radiation. Meanwhile, coatings specifically designed to block UV radiation tend to be fairly transparent to IR radiation. Thus, there is a need in the art for a coating which is effective at blocking significant amounts of both IR and UV radiation.

A coating sol comprising zinc antimonate is known in the art, under the tradename Celnax. For example, see Nissan Chemical's website at www.snowtex.com/celnax.htm for the absorption spectrum of Celnax sol (zinc antimonate sol) which is mixed with a resin. The nanoparticles of the antimony double oxide absorb significant amounts of IR, while allowing a good portion of UV and significant amounts of visible radiation to transmit therethrough. For example, see U.S. Pat. No. 6,149,888, the disclosure of which is hereby incorporated herein by reference.

However, it would be desirable if such coatings could be designed so as to improve blockage of UV radiation.

In certain example embodiments of this invention, coatings are provided which block more UV radiation than those discussed above. In certain example embodiments of this invention, a composite oxide coating is provided that efficiently blocks both UV and IR radiation. Certain embodiments of this invention relate to a colloidal electro-conductive oxide solution having infrared (IR) and ultraviolet (UV) blocking characteristics. In certain example embodiments of this invention, a substantially transparent composite oxide coating is provided that includes a silica matrix, zinc antimonate, and a UV blocking material, thereby permitting the sol after application to block significant amounts of both IR and UV radiation. In certain example embodiments of this invention, a UV and IR blocking coating comprises each of cerium oxide and zinc antimonate in the form of nanoparticulate and silicon oxide (e.g., $SiO_2$) formed from precursor materials such as silane(s). It has surprisingly been found that such coatings are effective at blocking both UV and IR radiation, and also are resistant to high temperatures as spectral response remains substantially unchanged in certain example instances after one or two hours of substantial heating (e.g., to about 400 or 450 degrees C.).

In certain example embodiments of this invention, the coating sol from which coatings are formed comprises from about 15 to 50% cerium oxide (more preferably from about 20 to 45%, and most preferably from about 30 to 40%), from about 30 to 70% zinc antimonate (more preferably from about 35 to 65%, and most preferably from about 40 to 55%), and from about 5 to 35% silicon oxide (more preferably from about 10 to 30%, and most preferably from about 12 to 25%). It has been found that these amounts of such materials in the coating sol provide a coating that is effective at blocking both UV and IR radiation, and is also resistant to high temperatures.

In certain example embodiments of this invention, there is provided a coating sol applied to a glass substrate to form a coating for blocking significant amounts of infrared (IR) and ultraviolet (UV) radiation, the coating comprising: silicon oxide: from about 5-35%; cerium oxide: from about 10-50%; and zinc antimonate: from about 30-70%. In certain example embodiments, the coated article has a transmission at 2300 nm of less than 10%. In certain example embodiments, the coated article has a transmission at 600 nm of at least about 60%, more preferably at least about 70%. In certain example embodiments, the coated article has an average transmission in the range of 300-380 nm of less than 25%, more preferably less than 15%, and most preferably less than 10%.

DETAILED DESCRIPTION OF EXAMPLE EMBODIMENTS OF THE INVENTION

Figure 1:
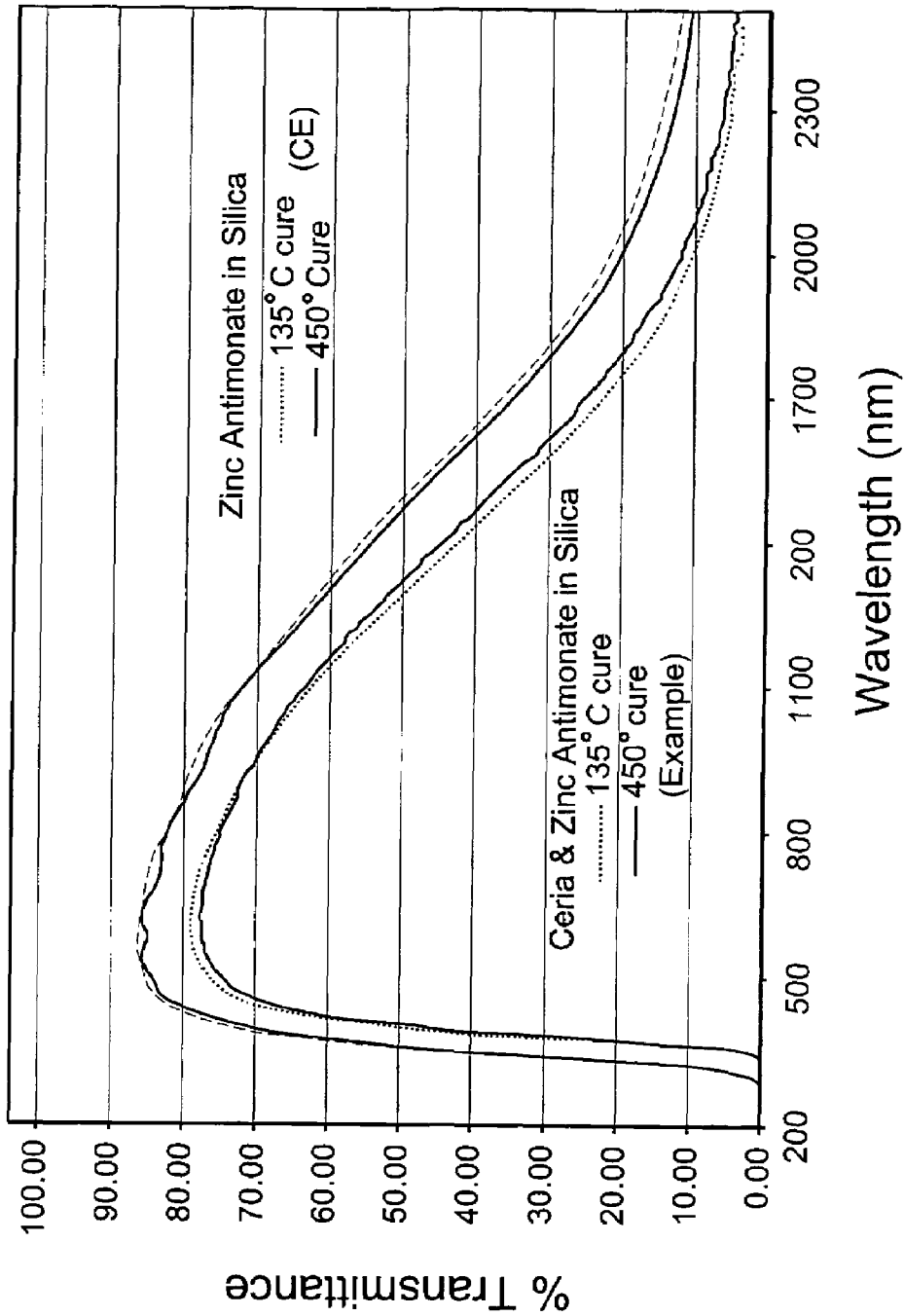
FIG. 1 is a graph comparing transmission characteristics of a coating according to an example embodiment of this invention to those of a known coating.

In certain example embodiments of this invention, coatings are provided which block more UV radiation than those discussed above. In certain example embodiments of this invention, a composite oxide coating is provided that efficiently blocks both UV and IR radiation.

Certain embodiments of this invention relate to a colloidal electro-conductive oxide solution having infrared (IR) and ultraviolet (UV) blocking characteristics. In certain example embodiments of this invention, a substantially transparent composite oxide coating is provided that includes a silica matrix, zinc antimonite, and a UV blocking material, thereby permitting the coating (e.g., applied via a coating sol) after application to block significant amounts of both IR and UV radiation. In certain example embodiments of this invention, a UV and IR blocking coating comprises each of cerium oxide and zinc antimonite in the form of nanoparticulate, and silicon oxide (e.g., $SiO_2$). It has surprisingly been found that such coatings are effective at blocking both UV and IR radiation, and also are resistant to high temperatures as spectral response remains substantially unchanged in certain example instances after one or two hours of substantial heating (e.g., to about 400 or 450 degrees C.). In certain example embodiments, the coated article has transmission for a wavelength of 2300 nm, of less than 10%.

In certain example embodiments of this invention, the sol type coating comprises from about 15 to 50% cerium oxide (more preferably from about 20 to 45%, and most preferably from about 30 to 40%), from about 30 to 70% zinc antimonate (more preferably from about 35 to 65%, and most preferably from about 40 to 55%), and from about 5 to 35% silicon oxide (more preferably from about 10 to 30%, and most preferably from about 12 to 25%). It has been found that these amounts of such materials in the sol type coating provide a coating that is effective at blocking both UV and IR radiation, and is also are resistant to high temperatures.

In the case where the colloidal antimony oxide is antimony oxide sol, the method of producing electroconductive anhydrous zinc antimonate inclusive coatings according to certain example embodiments can be produced by, inter alia, mixing antimony oxide sol and a zinc compound, and then calcining the mixture at 300 to 680 degrees C. after drying.

The zinc compound which can be used in certain example embodiments is at least one zinc compound selected from the group consisting of zinc hydroxide, zinc oxide, inorganic acid salts of zinc and organic salts of zinc. The inorganic acid salts of zinc include zinc carbonate, basic zinc carbonate, zinc nitrate, zinc chloride, zinc sulfate and the like. The organic acid salts of zinc include zinc formate, zinc acetate, zinc oxalate and the like. These zinc compounds may be those put on the market as industrial chemicals. When zinc hydroxide and zinc oxide are used, it is preferred that they have a primary particle diameter of 100 nm or less. In particular, the salts containing acids that vaporize upon calcination, for example, carbonate salts and organic acid salts, are preferred. They may be used alone or as admixtures of two or more of them.

The colloidal antimony oxide which can be used is antimony oxide having a primary particle diameter of 100 nm or less and includes diantimony pentoxide sol, hexaantimony tridecaoxide sol, diantimony tetroxide hydrate sol, colloidal diantimony trioxide and the like. The diantimony pentoxide sol can be produced by known methods, for example, a method in which diantimony trioxide is oxidized, a method in which an alkali antimonate is dealkalized with ion exchange resin, a method in which sodium antimonate is treated with an acid, and/or the like. The hexaantimony tridecaoxide sol can be produced by a method in which diantimony trioxide is oxidized and the diantimony tetroxide hydrate sol can also be produced by a method in which diantimony trioxide is oxidized. The colloidal diantimony trioxide can be produced by a gas phase method in certain example instances.

As the antimony oxide sol that can be used in certain example embodiments, there is an acidic sol that has a primary particle diameter of 2 to 100 nm, more preferably 2 to 50 nm, and that contains no or substantially no base such as amine or sodium hydroxide. As the antimony oxide sol, there can be used those sols that contain antimony oxide ($Sb_2O_5$, $Sb_5O_{1.3}$, and/or $Sb_2O_4$,). They may be used in the form of a dried antimony oxide sol that is prepared by spray drier, vacuum drier, freeze drier or the like. As the colloidal antimony oxide, there may be used those commercially available as industrial chemicals in the form of diantimony pentoxide sol, diantimony pentoxide powder, or diantimony trioxide superfine powder. The antimony oxide which can be used as a starting material may be selected such that its particle diameter range is a little broader than that of the product since calcination of it together with a zinc compound to form electroconductive anhydrous zinc antimonate is accompanied by a slight variation in particle diameter. In the case where the diantimony pentoxide sol is used as a starting material, a ZnO-doped diantimony pentoxide sol may be used as a starting material. The ZnO-doped diantimony pentoxide sol that can be obtained by dispersing diantimony trioxide and basic zinc carbonate in a water in a molar ratio, ZnO/$Sb_2O_5$, of 0.1 to 0.2 and by reacting the dispersion with hydrogen peroxide. Note that the doped ZnO shall be included in the ZnO/$Sb_2O_5$ molar ratio of 0.8 to 1.2 of a finally obtained electroconductive, anhydrous zinc antimonate.

The UV blocking material included in the coating may be of or include cerium oxide or the like in certain example embodiments of this invention. In certain example instances, it may be or include $CeO_2$ (or any other suitable stoichiometry). Addition of the cerium oxide to the coating further enhances the coating's UV blocking efficiency without significantly sacrificing visible transmission or thermal stability. In certain example embodiments, the UV blocking material may instead or additionally include or be of ZnO or the like.

The mixing of the above-described zinc compound and UV blocking compound (e.g., $CeO_2$) with the antimony oxide sol may be performed using a mixing apparatus such as SATAKE-type mixing apparatus, Fhaudler-type mixing apparatus, or disper at a temperature of from about 0 to 100 degrees C. for about 0.1 to 30 hours. The mixing of the above-described zinc compound with a dry product of the antimony oxide sol or colloidal diantimony trioxide, and the dry cerium oxide, may be conducted using an apparatus such as a mortar, a V-type mixer, a Henschel mixer, or a ball mill. The slurry (mixture) of the zinc compound, the antimony oxide sol, and cerium oxide can be dried using a spray drier, a drum dryer, a box-type hot air drier with circulation, a vacuum drier, or a freeze drier at an example of about 300 degrees C. or less. The slurry may be dried by separating the slurry by suction filtering, centrifugation filtering, or using a filter press and optionally removing soluble impurities from the starting material by pouring of water to form a wet cake, and drying the wet cake in the above box-type hot air drier with circulation and the like at a temperature ranging from room temperature to 300 degrees C. The drying may be performed at about 300 degrees C. or less taking into consideration the apparatus or operation and the calcination temperature.

In certain example embodiments, a dried product of the mixture may be calcined in a gas containing steam at a temperature of from about 300 to 680 degrees C., preferably no lower than about 350 degrees C. for from about 0.5 to 50 hours, preferably 2 to 20 hours. A temperature of no lower than 400 degrees C. and below 500 degrees C. is sometimes preferred in order to obtain sols having good electroconductivity and suffering from less agglomeration.

Here, the introduction of steam may be performed at about 100 degrees C. or higher in order to prevent the occurrence of frosts. The calcination may initiate solid phase reaction to produce electroconductive anhydrous zinc antimonate inclusive coating. The gas described above may include oxidizing gas, reducing gas, and/or inert gas. Examples of the oxidizing gas include oxygen, air, a mixed gas consisting of nitrogen and oxygen, and a mixed gas of nitrogen and air. The reducing gas includes, for example, hydrogen and carbon monoxide. The inert gas includes, for example, nitrogen, carbon dioxide, helium and argon. It is particularly preferred to use air or nitrogen. In certain example embodiments, an electroconductive anhydrous zinc antimonate may have the structure of $ZnSb_2O_6$. Also, the compound may have an open structure.

In certain example embodiments, electroconductive anhydrous zinc antimonate comprises as fine particles as colloid, with a primary particle diameter on the order of 5 to 100 nm, preferably 5 to 50 nm. Here, the term "primary particle diameter" means the diameter of a single separated particle, but not the diameter of agglomerate of the particles, which can be measured by electron microscopic observation. The cerium oxide particles may have the same size, or alternatively different size, in certain example embodiments of this invention. Further, the electroconductive zinc antimonate of the present invention can readily be converted into an aqueous or organic solvent sol by wet grinding of it in water or an organic solvent using a sand grinder, a ball mill, a homogenizer, a disper, a colloid mill or the like. In example embodiments where the electroconductive zinc antimonate is wet ground to form an aqueous or organic solvent sol of anhydrous zinc antimonate and so forth, the sol can, if desired, be stabilized by addition of an alkylamine such as ethylamine, propylamine, isopropylamine, or diisobutylamine, an alkanolamine such as triethanolamine or monoethanolamine, a diamine such as ethylenediamine, hydroxycarboxylic acid such as lactic acid, tartaric acid, malic acid, or citric acid. As the organic solvent, there can be used alcohols such as methyl alcohol, ethyl alcohol, propyl alcohol, and butyl alcohol, glycols such as ethylene glycol, diethylene glycol, and hexylene glycol, cellosolves such as ethylcellosolve and propylcellosolve, and amides such as dimethylformamide and dimethylacetamide. The anhydrous zinc antimonate has a particle diameter of 100 nm or less in the aqueous or organic solvent sol in certain example embodiments.

In certain example embodiments, the zinc antimonate inclusive material can be mixed with a silicon-containing substance such as a silane coupling agent to form a coating composition. For example, and without limitation, see U.S. Pat. No. 6,149,888, the disclosure of which is incorporated herein by reference.

A coating sol including the coating materials discussed above was coated on a substrate, and its transmission characteristics measured as shown in FIG. 1. In the FIG. 1 example, the coating sol was applied to a glass substrate and included cerium oxide and zinc antimonate in nanoparticulate form, and silicon dioxide, in amounts of 47 mole % zinc antimonate, 36 mole % cerium oxide and 17 mole % $SiO_2$. When this sol was applied to a glass substrate at a thickness of about 2 microns, the coated article yielded average UV transmission in the range of 300-380 nm of about 10% as shown in FIG. 1. When the cerium oxide was not present (see comparative example CE in FIG. 1), the UV transmission was undesirably higher. Different cure temperatures for the coating on the glass substrate are shown in FIG. 1 for the Example, and the CE. FIG. 1 also demonstrates that the coatings are resistant to high temperatures and the spectral response remained unchanged after heating at about 450 degrees C for about two hours.

While the coatings herein may be applied to the substrate so as to directly contact the substrate (e.g., glass substrate), it is possible that other layer(s) may be provided between the coating and the glass substrate in certain example instances. It is also possible that substrates of other materials may be used instead of glass.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article formed by applying a coating sol to a glass substrate to form a coating on the glass substrate, the coating for blocking significant amounts of infrared (IR) and ultraviolet (UV) radiation, the coating comprising:
   silicon oxide: from about 5-35 mol %
   cerium oxide: from about 30-45 mol %
   zinc antimonate: from about 30-70 mol %
wherein the coated article has a transmission at 2300 nm of less that 10%.

2. The coated article of claim 1, wherein the coating comprises:
   silicon oxide: from about 10-30 mol %
   cerium oxide: from about 30-45 mol %
   zinc antimonate: from about 35-65 mol %.

3. The coated article of claim 1, wherein the coating comprises:
   silicon oxide: from about 10-30 mol %
   cerium oxide: from about 30-40 mol %
   zinc antimonate: from about 40-55 mol %.

4. The coated article of claim 1, wherein the coated article has a transmission at 600 nm of at least about 60%.

5. The coated article of claim 1, wherein the coated article has a transmission at 600 nm of at least about 70%.

6. The coated article of claim 1, wherein the coated article has a transmission at 1700 nm of no greater than 30%.

7. The coated article of claim 1, wherein the coating is electrically conductive.

8. The coated article of claim 1, wherein the coated article has an average transmission in the range of 300-380 nm of no more than about 10%.

9. The coated article of claim 1, wherein the coating is provided directly on and contacting the glass substrate.

10. A coated article comprising a coating applied to a substrate, the coating comprising:
    silicon oxide: from about 5-35 mol %
    nanoparticles of a UV absorbing material: from about 30-45 mol % zinc antimonate: from about 30-70 mol %.
wherein the coated article has an average transmission in the range of 300-380 nm of less than 20%.

11. The coated article of claim 10, wherein the UV absorbing material comprises cerium oxide and wherein the coating comprises:
    silicon oxide: from about 10-30 mol %
    cerium oxide: from about 30-45 mol %
    zinc antimonate: from about 35-65 mol %.

12. The coated article of claim 11, wherein the coating comprises:
    silicon oxide: from about 10-30 mol %
    cerium oxide: from about 30-40 mol %
    zinc antimonate: from about 40-55 mol %.

13. The coated article of claim 10, wherein the coated article has a transmission at 600 nm of at least about 60%.

14. The coated article of claim 10, wherein the coated article has a transmission at 600 nm of at least about 70%.

15. The coated article of claim 10, wherein the coated article has a transmission at 1700 nm of no greater than 30%.

16. A coated article comprising a coating formulation applied to a substrate to form a coating for blocking significant amounts of IR and UV radiation, the coating comprising at least one IR blocking material an at least one UV blocking material, wherein the coating comprises from about 30-70 mol % zinc antimonate, from about 30-45 mol % cerium oxide, and silicon oxide such as $SiO_2$
    wherein the coated article has an average transmission in the range of 300-380 nm of no more than about 10%, and
    wherein the coated article has a transmission at 2300 nm of less than 10%.

17. A method of making a coated article, having a average transmission in the range of 300-380 nm of no more than about 10% and a transmission at 2300 nm of less than 10%, the method comprising:
    mixing a zinc compound, cerium oxide and a colloidal antimony oxide; and
    calcining the mixture in a gas to produce an electrically conductive coating;
    wherein the mixture comprises from about 30-45 mol % cerium oxide.

18. The method of claim 17, wherein the zinc compound and colloidal antimony oxide has a $ZnO/Sb_2O_3$ molar ratio of from about 0.8 to 1.2.

19. The method of claim 17, wherein the gas comprises air and/or nitrogen.

* * * * *